United States Patent
Gill

(10) Patent No.: US 6,542,343 B1
(45) Date of Patent: Apr. 1, 2003

(54) TUNNEL VALVE HEAD DESIGN TO LOWER RESISTANCE

(75) Inventor: Hardayal Singh Gill, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 09/636,386

(22) Filed: Aug. 9, 2000

(51) Int. Cl.$^7$ .................................................. G11B 5/39
(52) U.S. Cl. ..................................................... 360/324.2
(58) Field of Search ................................ 360/324, 324.2

(56) References Cited

U.S. PATENT DOCUMENTS

| | | | | |
|---|---|---|---|---|
| 5,649,351 A | * | 7/1997 | Cole et al. ........................ | 216/22 |
| 5,650,958 A | | 7/1997 | Gallagher et al. ............. | 365/173 |
| 5,712,612 A | | 1/1998 | Lee et al. .................... | 338/32 R |
| 5,731,937 A | | 3/1998 | Yuan ............................ | 360/113 |
| 5,754,376 A | * | 5/1998 | Kobayashi et al. ....... | 360/327.31 |
| 5,822,158 A | | 10/1998 | Matsuzono .................... | 360/113 |
| 5,862,022 A | | 1/1999 | Noguchi et al. ............. | 360/113 |
| 5,898,547 A | | 4/1999 | Fontana, Jr. et al. ........ | 360/113 |
| 5,898,548 A | | 4/1999 | Dill et al. ..................... | 360/113 |
| 5,901,018 A | | 5/1999 | Fontana, Jr. et al. ........ | 360/104 |
| 5,930,087 A | | 7/1999 | Brug et al. ................... | 360/113 |
| 5,982,177 A | | 11/1999 | Cadieu ......................... | 324/252 |
| 5,995,339 A | * | 11/1999 | Koshikawa et al. ......... | 360/321 |
| 6,288,871 B1 | * | 9/2001 | Tanabe ........................ | 360/126 |
| 6,327,107 B1 | * | 12/2001 | Komuro et al. ........... | 360/324.2 |

FOREIGN PATENT DOCUMENTS

JP 8115511 5/1996

OTHER PUBLICATIONS

IEEE Transactions on Magnetics. vol. 35. No. 5 Sep. 1999; R. Coehoorn et al.; The electrical and magnetic response of yoke–type read heads based on a magnetic tunnel junction.
IEEE Transactions on Magnetics. vol. 35. No. 5 Sep. 1999; M. Yoshida et al.; Writing performancce of IND/SV combination heads with sub–micron track width.
R7D Dept., DASCOM, TDK Corporation, 462–1 Otai, Saku–shi, Nagano, 385–0009, Japan; Head Div. No. 1, DASCOM, TDK Corporation, 543 Otai, Saku–shi, Nagano, 385–8555, Japan; Evaluation of front flux guide type magnetic tunnel junction heads.

* cited by examiner

Primary Examiner—Brian E. Miller
(74) Attorney, Agent, or Firm—Lumen Intellectual Property Services, Inc.

(57) ABSTRACT

A magnetic tunnel junction (MTJ) head for a magnetic recording system includes a MTJ valve and a first flux guide disposed proximate a first edge of the MTJ valve. The first flux guide has a first portion, which defines the track width, proximate a an air bearing surface of the MTJ head and a second portion proximate the first edge. The width of the first portion, the track width, is smaller than the width of the second portion, the MTJ valve's width. The resistance of the MTJ valve is lower since the cross-sectional area of the MTJ valve is not decreased as the track width is decreased. The MTJ head further includes a second flux guide proximate a second edge, which is farther from the air bearing surface than the first edge.

39 Claims, 7 Drawing Sheets

TUNNEL VALVE HEAD DESIGN TO LOWER RESISTANCE

FIELD OF THE INVENTION

This invention relates generally to magnetic tunnel junction (MTJ) heads. More particularly, it relates to MTJ heads with flux guides defining the track widths of MTJ heads.

BACKGROUND ART

Magnetic tunnel junction (MTJ) devices based on the phenomenon of spin-polarized electron tunneling. A typical MTJ device includes two ferromagnetic layers separated by a thin insulating tunnel barrier layer. One of the ferromagnetic layers has a higher saturation field in one direction of an applied magnetic field, typically due to its higher coercivity, than the other ferromagnetic layer. The insulating tunnel barrier layer is thin enough that quantum mechanical tunneling of electrons can occur between the ferromagnetic layers. The tunneling phenomenon is electron-spin dependent, making the magnetic response of the MTJ a function of the relative orientations and spin polarizations of the two ferromagnetic layers.

MTJ devices have been proposed primarily as memory cells for solid state memory devices. The state of the MTJ memory cell is determined by measuring the resistance of the MTJ when a sense current is passed perpendicularly through the MTJ from one ferromagnetic layer to the other. The probability of tunneling of charge carriers across the insulating tunnel barrier layer depends on the relative alignment of the magnetic moments (magnetization directions) of two ferromagnetic layers. The tunneling current is spin polarized, which means that the electrical current passing from one of the ferromagnetic layers, for example, a layer whose magnetic moment is fixed or prevented from rotation, is predominantly composed of electrons of one spin type (spin up or spin down, depending on the orientation of the magnetic moment of the ferromagnetic layer). The degree of spin polarization of the tunneling current is determined by the electronic band structure of the magnetic material comprising ferromagnetic layer at the interface of the ferromagnetic layer with the tunnel barrier layer. The first ferromagnetic layer thus acts as a spin filter. The probability of tunneling of the charge carriers depends on the availability of electronic states of the same spin polarization as the spin polarization of the electrical current in the second ferromagnetic layer. Usually, when the magnetic moments of the first and second ferromagnetic layers are parallel to each other, there are more available electronic states than when the magnetic moments of the two ferromagnetic layers are aligned antiparallel to each other. Thus, the tunneling probability of the charge carriers is highest when the magnetic moments of both layers are parallel, and is lowest when the magnetic moments are antiparallel. When the moments are arranged neither parallel nor antiparallel, the tunneling probability takes on an intermediate value. Thus, the electrical resistance of the MTJ memory cells depends on the spin polarization of the electrical current and the electronic states in both of the ferromagnetic layers.

MTJ heads have attracted more attention since a large tunneling magneto-resistance (TMR) was found at room temperature. These MTJ heads with TMR larger than 40% are potentially applicable as magnetoresistive read heads for high areal density recording. However, prior to head application, several design issues must be worked out. These issues include shield to shield distance, longitudinal biasing, and shorting across the insulating tunnel barrier during mechanical lapping processes. The shorting problem is particularly important since the head typically undergoes several lapping processes during the definition of the air bearing surface (ABS). More importantly, future higher areal density data storage requires that MTJ heads be able to operate at ever-decreasing track widths (TW). However, the cross-sectional area of an MTJ head decreases as the track width decreases. Generally, the resistance of an MTJ head depends inversely on the cross-sectional area of the MTJ valve. The resistance of an MTJ head can become very high for a sufficiently small cross-sectional area. A larger resistance generally means a larger noise level in the MTJ head, which leads to a poor signal to noise ratio (SNR).

U.S. Pat. No. 5,898,547 issued Apr. 27, 1999 and U.S. Pat No. 5,901,018 issued May 4, 1999 to Fontana, Jr. et al. disclose a magnetic tunnel junction (MTJ) magnetoresistive read head having an MTJ sensing or free ferromagnetic layer that functions as a rear flux guide to direct magnetic flux from a magnetic recording medium to the tunnel junction. The back edge of the free layer is located farther than the back edges of the tunnel barrier layer and the pinned layer from a sensing surface of the MTJ heads. Unfortunately, the track widths of the MTJ heads have not been reduced to optimize the efficiency of the MTJ heads. Furthermore, Fontana et al. does not teach the prevention of electrical shorts during the definition of air bearing surface (ABS).

U.S. Pat No. 5,930,087 issued Jul. 27, 1999 to Brug et al. discloses a robust recording head with a spin tunneling sensing element separated from an interface between the recording head and a recording media to prevent collisions and other ill effects at this interface. The spin tunneling sensing element includes a pair of magnetic elements, wherein one of the magnetic elements functions as a flux guide that conducts magnetic flux emanating from a recording medium away from the interface to an active area of the spin tunneling sensing element. However, Brug does not teach the use of a flux guide for reducing track width to optimize the efficiencies of the robust recording heads.

Japanese published patent application JP8-115511, published May, 7, 1996 discloses the use of a flux guide to improve the signal to noise ratio of a spin valve type GMR head by increasing a signal level from the spin valve as the track width is reduced. However, this publication does not address MTJ heads. Furthermore, the publication does not address reducing the noise level.

An article entitled "Evaluation of Front Flux Guide Type Magnetic Tunnel Junction Heads" published April 2000 in INTERMAG 2000 Conference Digest to Shimazawa et al. discloses magnetic tunnel junctions (MTJs) heads using the free layers as flux guide to prevent the electrical short during the definition of the air bearing surface (ABS). Unfortunately, Shimazawa et al. does not teach the use of a flux guide for reducing the track width so that the efficiencies of the MTJs heads are optimized.

Another article entitled "The Electrical and Magnetic Response of Yoke-Type Read Heads Based on A Magnetic Tunnel Junction" by Coehoorn et al. and published IEEE Transactions on Magnetics, vol. 35, No. 5, September 1999, discloses yoke-type read heads containing a tunnel junction magnetoresistive element (TMRE) that includes a front upper flux guide, a back upper flux guide, and a bottom flux guide. Coehoorn et al. does teach the use of the front flux guide with an anisotropic permeability to minimize side reading for a small track width, but does not teach the use of the flux guide for reducing the resistance to increase areal density of magnetic storage media.

There is a need, therefore, for an MTJ head including a flux guide that overcomes the above difficulties.

OBJECTS AND ADVANTAGES

Accordingly, it is a primary object of the present invention to provide MTJ heads with flux guides that prevent electrical shorting of the MTJ layers during the definition of air bearing surface.

It is a further object of the invention to provide MTJ heads with flux guides that reduce the track widths while leaving the cross-sectional areas unchanged. Therefore, the resistance of the tunnel junction valve is reduced, which reduces noise and improves the signal to noise ratio.

It is an additional object of the invention to provide MTJ heads with flux guides to prevent the leakage of the magnetic flux into the shields of the MTJ sensors.

It is another object of the invention to provide MTJ heads with flux guide enhancing the flux coupling to the MTJ sensor.

It is another object of the present invention to provide a MTJ heads have high efficiencies.

It is a further object of the present invention to provide a method for producing MTJ heads having above properties.

SUMMARY

These objects and advantages are attained by MTJ heads having flux guides proximate the edges of MTJ valves.

According to a first embodiment of the present invention, a MTJ head includes a MTJ valve and a first flux guide proximate the first edge of the MTJ valve. An insulating layer is located between the MTJ valve and the first flux guide for electrical insulation between these layers. The first flux guide has a first portion, which defines the track width of the MTJ head, proximate an air bearing surface of the MTJ head, and a second portion proximate the first edge. The width of the first portion, which defines the track width, is smaller than the width of the second portion, the sensor width. As a result, the cross-sectional area of the MTJ valve is not decreased when the track width is reduced. Therefore, the resistance of the MTJ head is lower, which optimizes the signal to noise ratio of the MTJ head by reducing a noise level of the MTJ valve.

The MTJ head further includes a second flux guide proximate a second edge of the MTJ valve, which is farther from the air bearing surface than the first edge. A second insulating layer is located between the second flux guide and the MTJ valve for electrical isolation. The MTJ head also includes two shields that act as the electrical leads. The first and the second flux guides are electrically insulated from these shields.

The MTJ head also includes two hard bias layers disposed on both sides of the MTJ valve and the first and second flux guides for biasing the MTJ valve and the flux guides. Two other insulating layers are disposed between the hard bias layers and the MTJ valve and the first and second flux guides for electrical isolation. Two hard bias layers are also insulated from the shields. The first and second flux guides are typically made of magnetically soft materials such as permalloys of Co, Ni, and Fe. The insulating layers are typically made of $Al_2O_3$, AlN, or MgO.

An MTJ valve typically includes a ferromagnetic free layer, a ferromagnetic pinned layer, and an insulating barrier layer disposed between the free layer and the pinned layer for permitting tunneling current in a direction generally perpendicular to the planar pinned and free layers. Since the free and pinned layers are very thin, there is a risk of an electrical short between these two layers due to smearing during the polishing the air bearing surface. By using the first flux guide the electrical short is prevented since the surface of the flux guide is polished as opposed to the edges of MTJ valve layers. Furthermore, a flux guide with an appropriate height may be used to prevent some of the magnetic flux from leaking into the shields.

MTJ heads of the type depicted in the first embodiment are made by a method according to a second embodiment of the present invention. A MTJ valve is made by sputtering or vacuum deposition on a first shield of the layers at a wafer level. Material is selectively removed from the wafer to define the MTJ valve. A first insulating layer and a second insulating layer are deposited proximate a first and a second edge of the MTJ valve such that the second edge is farther from an air bearing surface of the MTJ head than the first edge. A first flux guide and a second flux guide are deposited adjacent to the first and the second insulating layers respectively. The first flux guide has a defined track width, which is smaller than the width of the MTJ valve.

Two insulating layers are deposited on two other sides of the MTJ valve before two hard bias layers are deposited in proximity to these two insulating layers. The MTJ valve and the first and second flux guides are located between these two hard bias layers. A second shield is then deposited such that the first and second shields sandwich the MTJ valve. Third and fourth insulating layers are deposited to electrically insulate the first and second flux guides from the second shield. Furthermore, two other insulating layers are also deposited between the hard bias layers and the second shield to electrically insulate the hard bias layers from the second shield.

The MTJ heads of the type depicted in the first and second embodiments may be incorporated into a disk drive according to a third embodiment of the present invention. A disk drive system includes a magnetic recording disk connected to a motor, a MTJ head connected to an actuator. The actuator moves the MTJ head across different regions in the magnetic recording disk, and the motor spins the magnetic recording disk relative to the MTJ head.

MTJ heads and disk drives made according to the various embodiments of the present invention exhibit reduced track widths while leaving the cross-sectional area of the MTJ unchanged. Therefore, the resistance of the MTJ head is reduced, and the signal to noise ratio is improved.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1A:
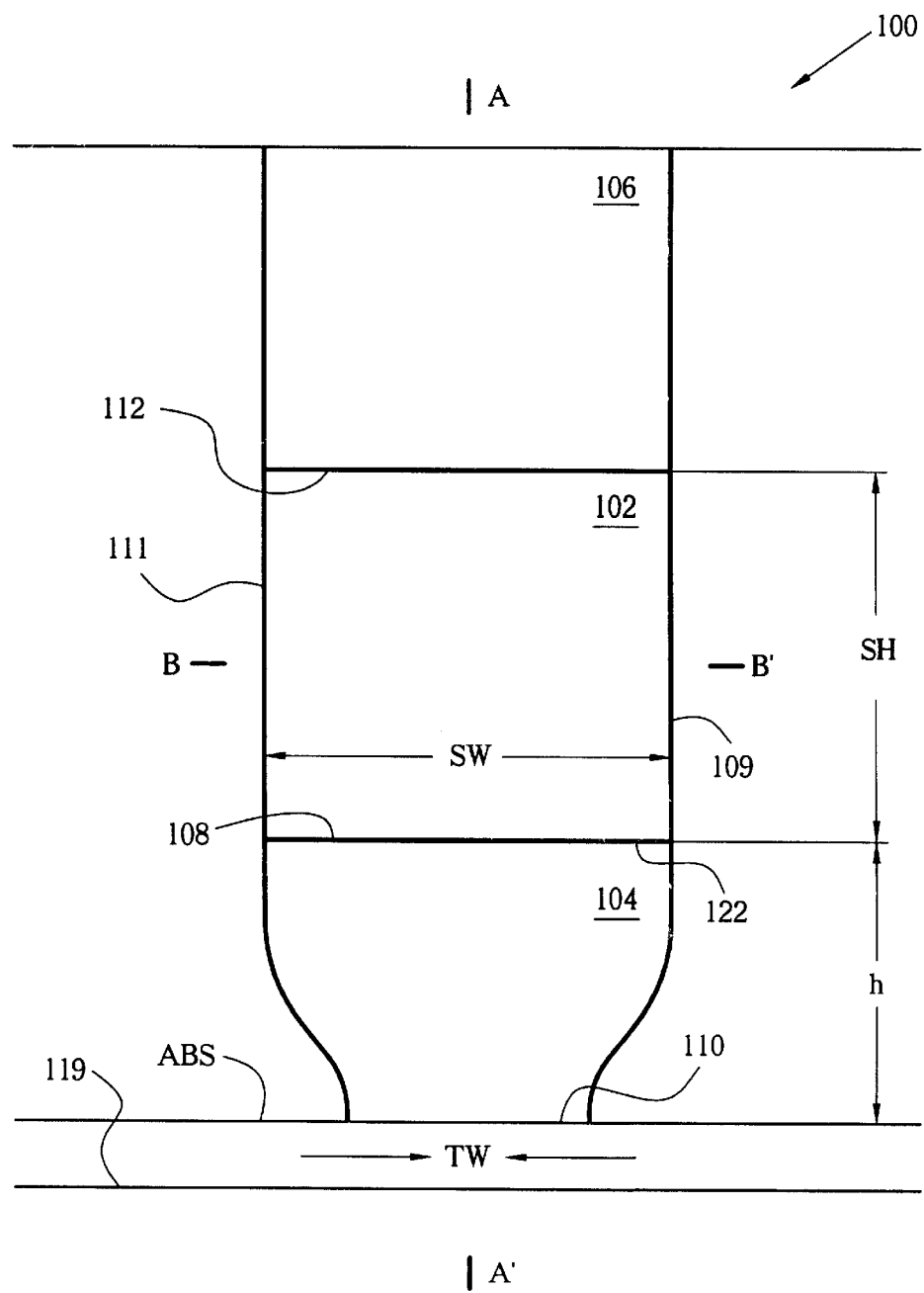
FIG. 1A depicts a schematic diagram showing a top view of a magnetic tunnel junction (MTJ) head according to a first embodiment of the present invention.
Figure 1B:
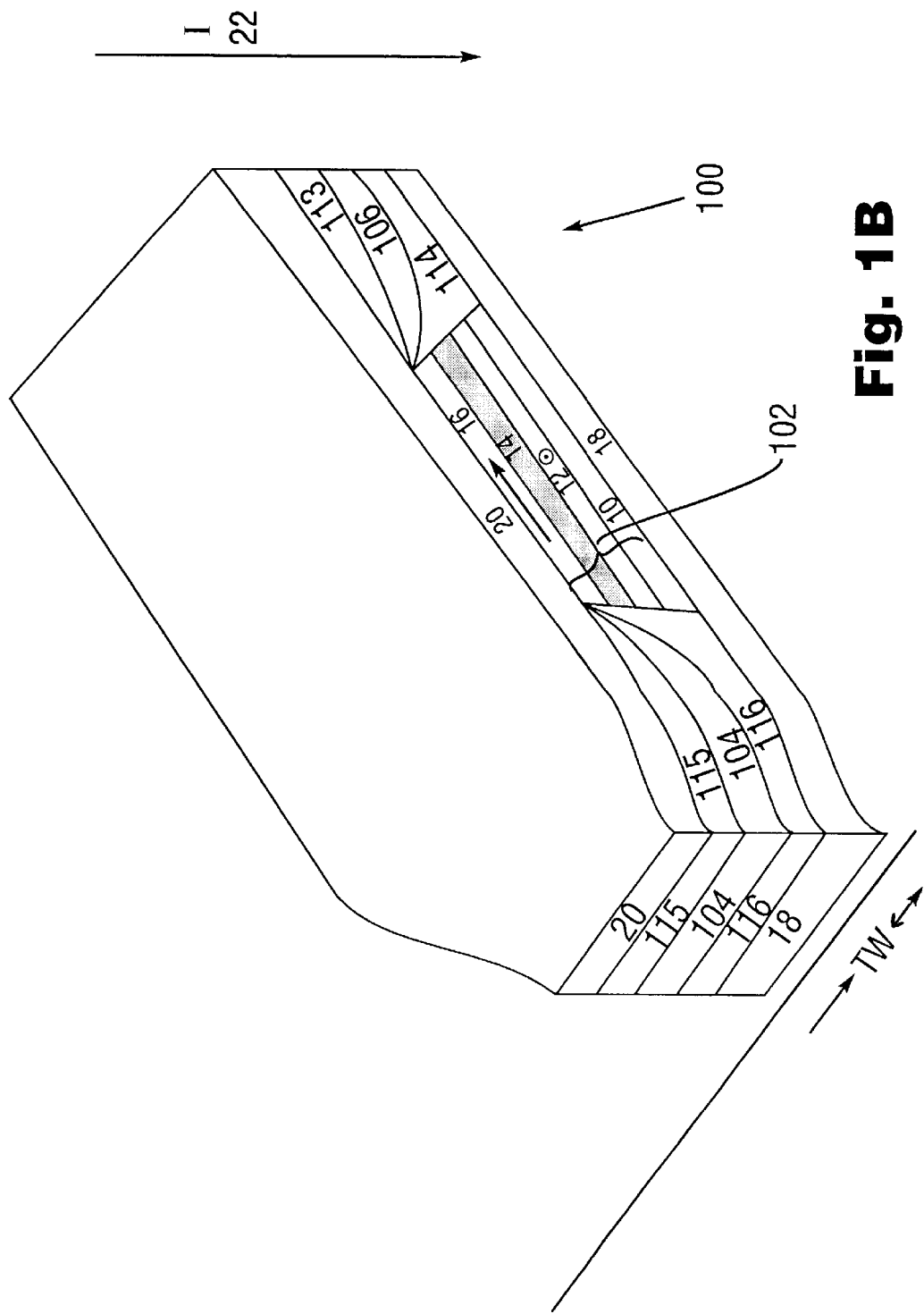
FIG. 1B depicts a perspective view of the MTJ head depicted in FIG. 1A.

FIG. 1A depicts a schematic diagram showing a top view of a magnetic tunnel junction head 100 according to a first embodiment of the present invention. FIG. 1B shows a perspective view of the magnetic tunnel junction head (MTJ) 100. The view in FIG. 1B is a partial cutaway view that illustrates the structure of the layers that make up the MTJ 100.

As shown in FIG. 1A, the MTJ head 100 includes a magnetic tunnel junction valve 102 having a first edge 108 proximate a first flux guide 104. The first flux guide 104 includes a first portion 110 proximate a surface of a magnetic medium 119 and a second portion 122 proximate the MTJ valve 102. A surface of the MTJ head 100 proximate the magnetic medium 119 is referred to herein as the air bearing surface (ABS). A width of the first portion 110 of the first flux guide 104 defines a track width (TW) of the MTJ valve 102. A width of the second portion 122 of the first flux guide 104 defines a sensor width (SW) of the MTJ valve 102. The width of the first portion 110 defines a track width (TW). The flux guide 104 tapers such that a width of the first portion is smaller than a width of the second portion 122. The width of the second portion 122 defines a sensor width (SW). In the example shown in FIG. 1A, the cross-sectional area of the MTJ valve 102 is just the product of SW and a sensor height (SH). The cross-sectional area of the MTJ valve 102 may therefore be unchanged or increased as the track width (TW) decreased due to the tapering of the flux guide 104.

Tunnel valves, such as MTJ valve 102 are subject to shot noise as well as thermal noise. A noise level in an MTJ head such as MTJ head 100 typically depends on the square root of the resistance of the MTJ valve 102. The resistance of the MTJ valve, in turn, depends inversely on the cross-sectional area. By keeping the cross-sectional area of MTJ valve 102 large, the use of the flux guide 104 may reduce the resistance of the MTJ valve 102 compared to what it would have been with a smaller track width (TW) and a smaller cross-sectional area. The reduced resistance reduces the noise level, thereby improving the signal to noise ratio of the MTJ head 100. A spin valve by contrast has a resistance that generally does not depend inversely on cross-sectional area as defined above. Therefore, a spin valve would not benefit from an increase in cross-sectional area in the same way as an MTJ valve.

Figure 1C:
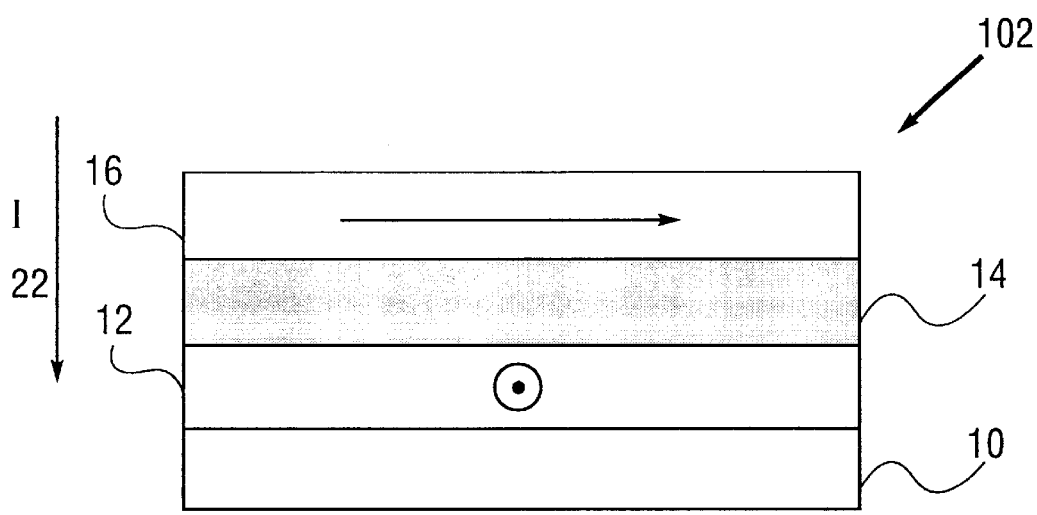
FIG. 1C depicts a cross-sectional schematic diagram of the MTJ valve of the MTJ head depicted in FIGS. 1A–B.
Figure 1D:
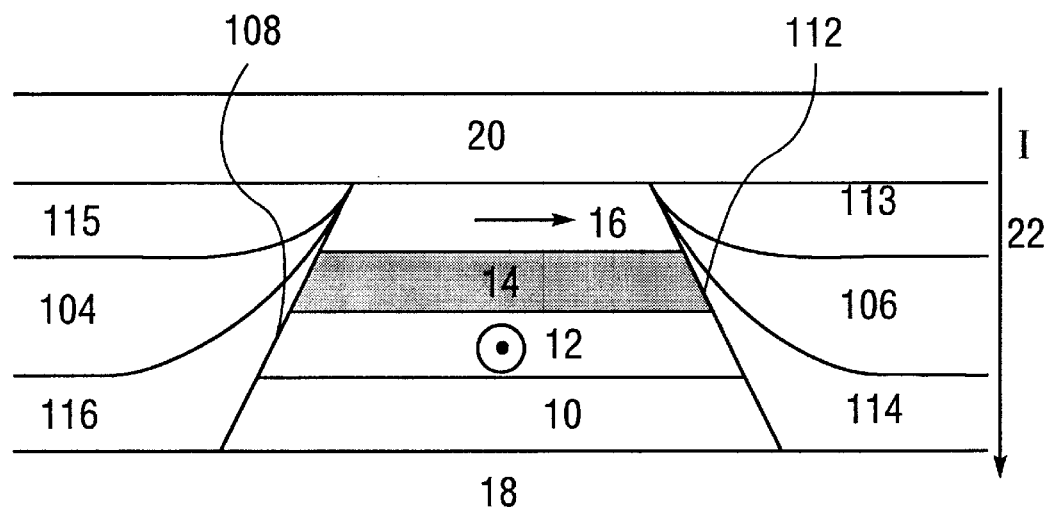
FIG. 1D depicts a cross-sectional schematic diagram of the MTJ head depicted in FIG. 1A along the line A—A'.

As shown in FIGS. 1B and 1D, which is a cross-sectional schematic diagram of the MTJ head 100 along a line A—A' with respect to FIG. 1A, the MTJ head 100 further includes two shields 18 and 20 sandwiching the MTJ valve 102. Shields 18 and 20 act as the electrical leads for the MTJ valve 102. A first insulating layer 116 disposed between the first flux guide 104 and the MTJ valve 102 for providing electrical insulation for the first flux guide 104 from the MTJ valve 102 and shield 18. The magnetic tunnel junction head 100 may optionally include a second flux guide 106 proximate the second edge 112, which is farther from the air bearing surface ABS than the first edge 108. A second insulating layer 114 is disposed between the second flux guide 106 and the MTJ valve 102 for providing electrical insulation for the second flux guide 106 from the MTJ 102 and shield 18. Furthermore, third and fourth insulating layers 115 and 113 provide electrical insulation for the first and second flux guides 104 and 106 from the shield 20 respectively.

Figure 1E:
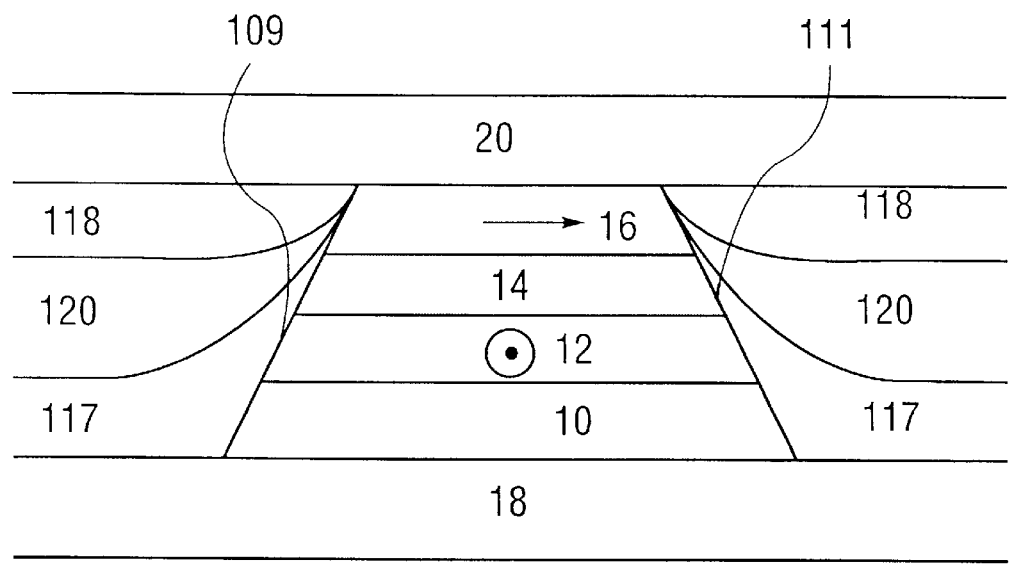
FIG. 1E depicts a cross-sectional schematic diagram of the MTJ head depicted in FIG. 1A along the line B—B'.

The magnetic tunnel junction head 100 may further include two hard bias layers 120 disposed on the third and fourth sides 109 and 111 of the MTJ valve 102 as shown in FIG. 1E, which is a cross-sectional schematic diagram of MTJ head 100 along a line B—B' with respect to FIG. 1A. Insulating layers 117 are typically disposed between the hard bias layers 120 and the tunnel junction valve 102 for providing electrical insulation for these hard bias layers 120 from the MTJ 102 and shield 18. Alternatively, if the hard bias layers 120 are made of insulating materials, the insulating layers 117 are not necessary. Furthermore, insulating layers 118 provide electrical insulation for hard bias layers 120 from the shield 20. The hard bias layers 120 may be used to bias both the magnetic tunnel junction valve 102 and the first and the second flux guides 104 and 106.

The first and the second flux guides 104 and 106 are typically made of soft and ferromagnetic materials such as permalloys of Ni, Fe and Co, for example $Ni_{80}Fe_{20}$. The hard bias layers 120 are typically made of Co, Pt or Cr. The insulating layers 113, 114, 115, 116, 117 and 118 are typically made of $Al_2O_3$, AlN, and MgO or combinations of these materials. Two shields 18 and 20 are typically made of ferromagnetic materials such as NiFe, NiFeCo, FeN, and FeAlSi.

The layer structure of the magnetic tunnel junction valve 102 is shown in FIG. 1C. Magnetic tunnel junction valve 102 typically includes an antiferromagnetic (AF) layer 10 pinning a magnetization of a ferromagnetic pinned layer 12. The tunnel junction valve 102 further includes a ferromagnetic free layer 16 having a magnetization oriented by the ferromagnetic pinned layer 12, and an insulating tunnel barrier layer 14 located between the free layer 16 and the pinned layer 12. A dot in pinned layer 12 and an arrow in free layers 16 respectively show the directions of the magnetizations of these two layers, which are perpendicular to each other. The insulating tunnel barrier 14 permits a tunneling sense current in a direction 22 generally perpendicular to the pinned layer 12 and the free layer 16.

The antiferromagnetic layer 10 is typically made of a permalloy consisting of Mn, such as NiMn, PrMn, or FeMn. The ferromagnetic pinned layer 12 is typically made of Co or CoFe. The insulating barrier 14 is typically made of $Al_2O_3$, AlN, MgO or combinations of these insulating materials with a thickness of about 20 Å.

The free layer 16, the pinned layer 12, and the insulating barrier layer 14 are typically very thin. There could be an electrical short of the tunneling sense current between these two layers due to smearing of the edges of these layers during the polishing of the magnetic tunnel junction head 100 if the layers of MTJ valve 102 are proximate the air bearing surface ABS during polishing. The structure of the MTJ head 100 prevents such an electrical short since the first flux guide 104 and associated insulating layers 115, 116 are disposed between the tunnel junction valve 102 and the air bearing surface. Thus, the surface of the first flux guide 104 and associated insulating layers 115, 116 are polished as opposed to tunnel junction valve 102 when polishing the ABS.

Figure 1F:
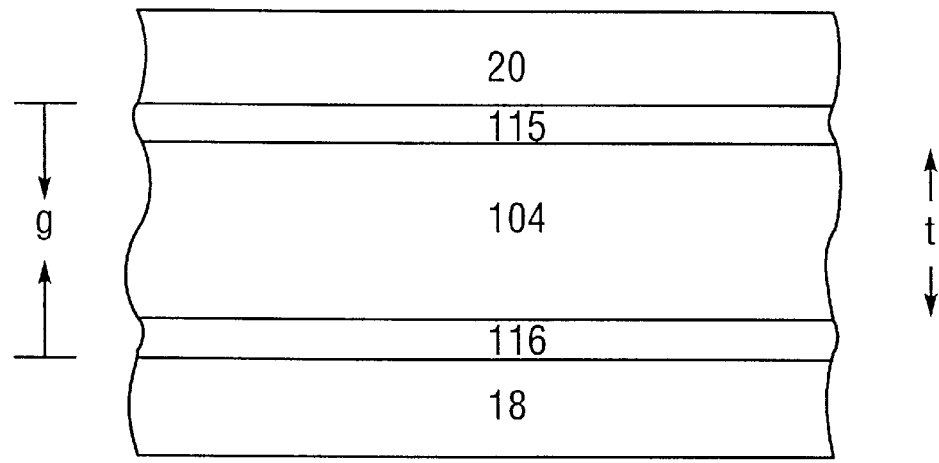
FIG. 1F depicts a cross-sectional schematic diagram of a portion including the first flux guide of the MTJ head depicted in FIG. 1D.

The first flux guide 104 directs a magnetic flux from a magnetic recording medium 119 to the tunnel junction valve 102, thereby enhancing the flux coupling to the tunnel junction valve 102. Furthermore, some of the incident magnetic flux leaks to the magnetic shields 18 and 20. This leakage is determined by the shield to shield half gap width g/2 over the first flux guide 104 and thickness t of first flux guide 104 as shown in FIG. 1F. The leakage additionally depends on the permeability $\mu$ of the first flux guide 104. The value for $\mu$ may be about 1000, for Permalloy. A height h of the first flux guide 104, as shown in FIG. 1A is typically less than a characteristic length $\lambda$ calculated by $\lambda=(\mu tg/4)^{1/2}$. To optimize the efficiency of the magnetic tunnel junction head 100, it is desirable to reduce the leakage of flux into shields 18 and 20. Alternatively, the shield to shield gap width g may be reduced. Either way, the height h of the first flux guide 104 is typically decreased to optimize efficiency. A sample of a magnetic tunnel junction head 100 with a resistivity of about 50 $\Omega\mu m^2$ may typically have the dimensions of a sensor width SW 122 of about 0.5 $\mu$m, a sensor height t of about 0.2 $\mu$m, a first flux guide height h of about 0.2 $\mu$m and a track width TW 110 of about 0.1 $\mu$m.

Figure 2A:
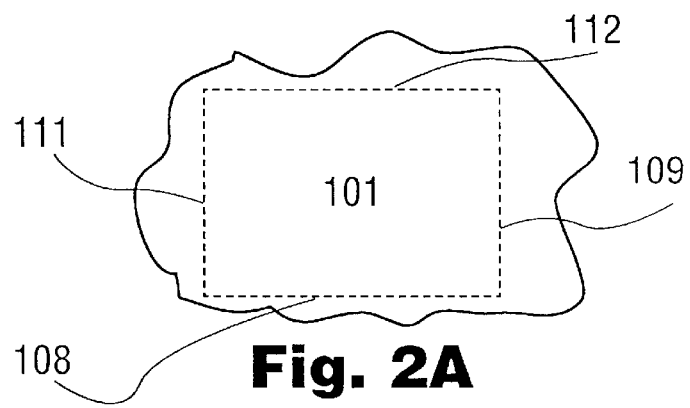
FIGS. 2A–2E depict schematic diagrams showing the steps of making a MTJ head depicted in FIGS. 1A–1B according to a second embodiment of the present invention.

A method for making a magnetic tunneling junction head 100 described in FIGS. 1A–B is illustrated in FIGS. 2A–2F according to a second embodiment of the present invention. A schematic diagram illustrating a top view of an undefined MTJ valve 101 is shown in FIG. 2A. The MTJ valve 101 may be produced by depositing the MTJ valve layers on a shield at a wafer level by sputtering or evaporation. A person with average skill in the art will be familiar with the process of making a magnetic tunnel junction valve.

Figure 2B:
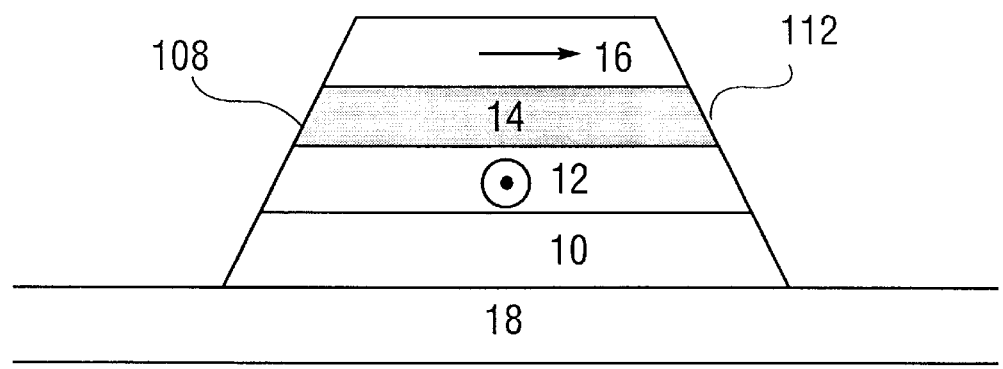

Material is removed from the undefined tunnel junction valve 101 to define the MTJ valve 102 shown in FIG. 2B, which illustrates a cross-sectional schematic diagram of the MTJ valve 102 depicted in FIG. 2A.

Figure 2C:
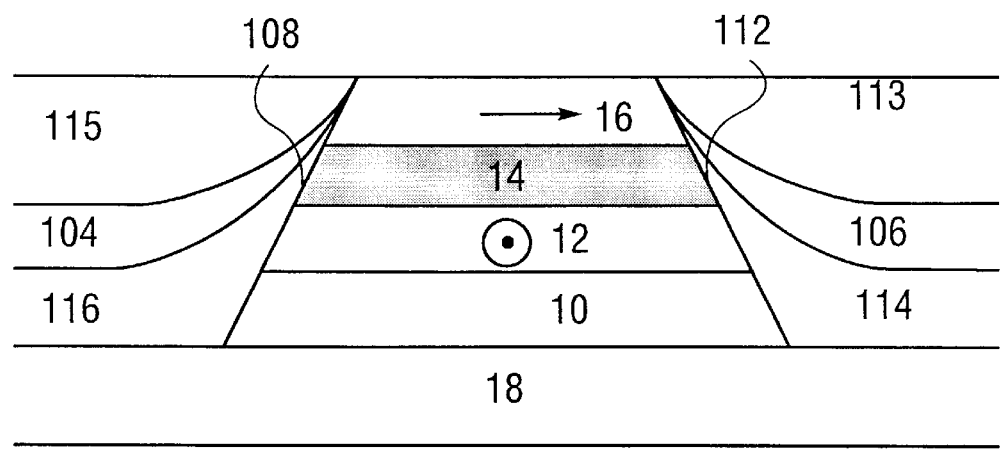

FIG. 2C shows steps of depositing the insulating layers and the flux guides. Insulating layers 116 and 114 are deposited respectively at a first edge 108 and a second edge 112 of the MTJ valve 102. Depending on the deposition process, insulating layers 116, 114 may be deposited at the same time as part of an insulating layer deposition process. A first flux guide 104 with a defined track width 110 smaller than a sensor width 122 is deposited adjacent the first insulating layer 116, and a second flux guide 106 is deposited adjacent the second insulating layer 114. Depending on the deposition process, flux guides 106, 104 may be deposited at the same time as part of a flux guide material deposition process.

Insulating layers 115 and 113 are deposited in proximity to the first and the second flux guides 104 and 106 respectively. Depending on the deposition process, insulating layers 115, 113 may be deposited at the same time as part of an insulating layer deposition process. Insulating layers 115, 116, 113 and 114 provide electrical insulation for the flux guides 104 and 106 from the MTJ valve 102 and shields 18 and 20.

Figure 2D:
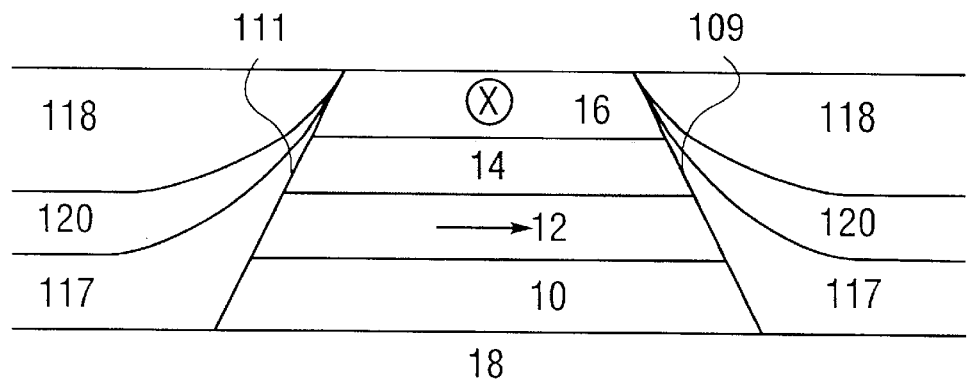

Insulating layers 117 are deposited on the other two sides 109 and 111 of the MTJ valve 102 and the first and the second flux guide 104 and 106, as shown in FIG. 2D. Two hard bias layers 120 are then deposited adjacent to these insulating layers 117 to stabilize the magnetization of the MTJ valve 102 and the first and second flux guides 104 and 106. The flux guides 104 and 106 and the hard bias layers 120 may be deposited by sputtering or vacuum deposition. Insulating layers 117 provide electrical insulation for hard bias layers 120 from the MTJ valve 102 and the shield 18.

The insulating layers 117 may be deposited at the same time as the insulating layers 116, 114 of FIG. 2C as part of the same deposition process. Alternatively, if the hard bias layers 120 are made of insulating materials, the depositions of the insulating layers 117 may not be necessary.

Figure 2E:
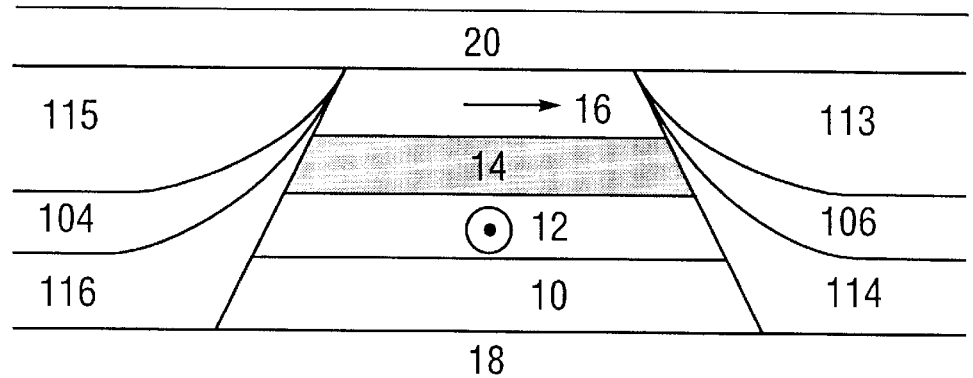
Figure 2F:
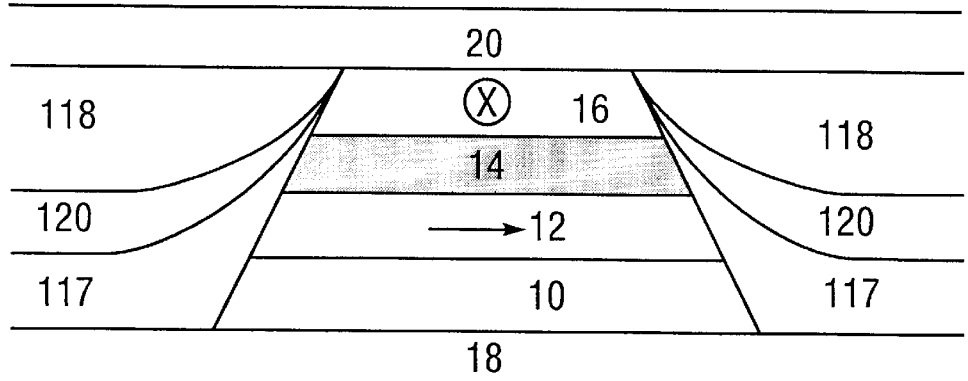
Figure 3:
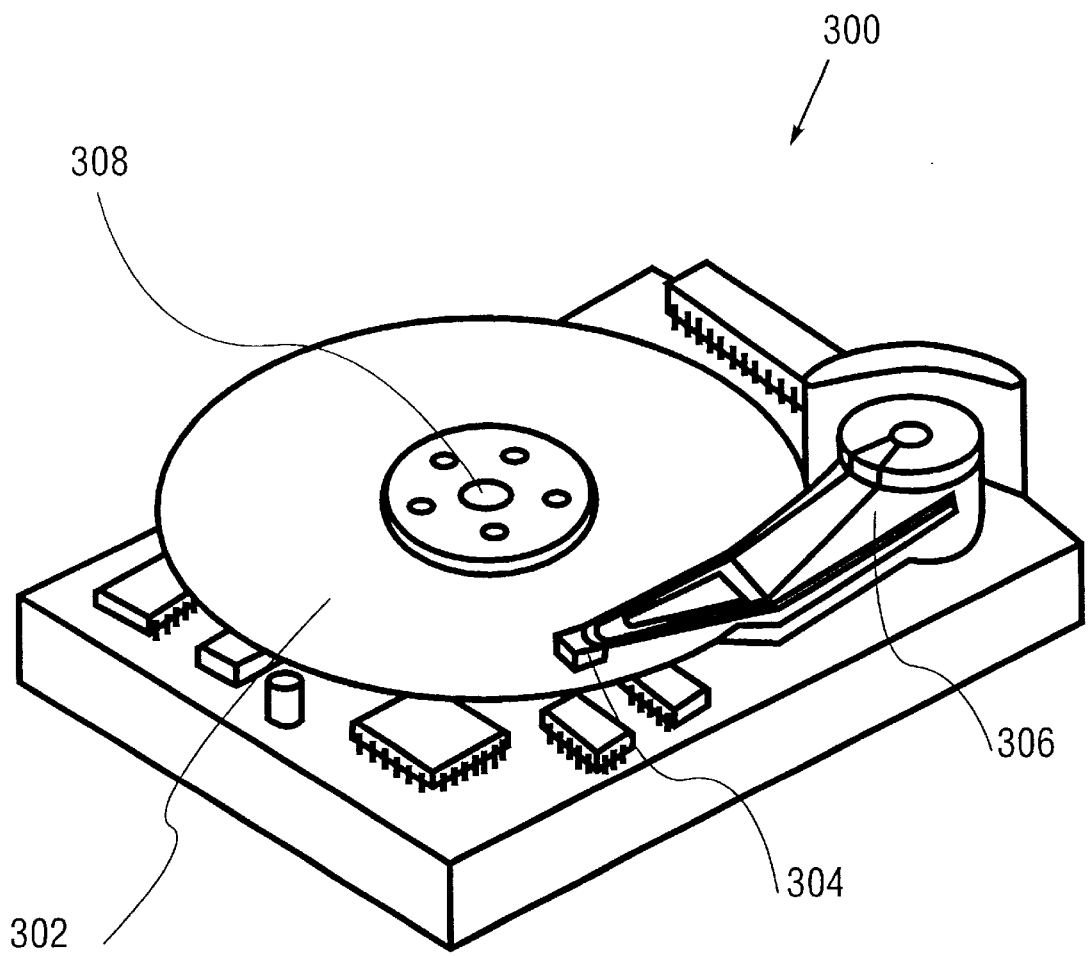
FIG. 3 depicts a disk drive according to a third embodiment of the present invention including an MTJ head of the type depicted in FIGS. 1A–1B.

FIGS. 2E–F illustrates a step of depositing the shield 20 to complete the structure of the MTJ head 100. Other insulating layers 118 are deposited between the hard bias layers 120 and shield 20 for providing electrical insulation for the hard bias layers 120 from the shield 20. The insulating layers 118 may be deposited at the same time as insulating layers 115, 113 as part of the same deposition process. The insulating layers 113, 114, 115, 116, 117 and 118 typically have thicknesses about 200 Å.

The magnetic tunnel junction head of the type depicted in FIGS. 1A–B and 2E–F may be incorporated in a disk drive 300 according to a third embodiment of the present invention. The disk drive 300 generally includes a magnetic recording disk 302, a magnetic tunnel junction head 304, an actuator 306 connected to the magnetic tunnel junction head 304, and a motor 308 connected to the disk 302. The tunnel junction head 304 includes a tunnel junction valve having features in common with that described above with respect to FIGS. 1A–B and 2E–F. The motor 308 spins the disk 302 with respect to magnetic tunnel junction head 304. The actuator 306 moves the magnetic tunnel junction head 304 across the magnetic recording disk 302 so the magnetic tunnel junction head 304 may access different regions of magnetically recorded data on the magnetic recording disk 302.

It will be clear to one skilled in the art that the above embodiment may be altered in many ways without departing from the scope of the invention. Accordingly, the scope of the invention should be determined by the following claims and their legal equivalents.

What is claimed is:

1. A magnetic tunnel junction head comprising:
   a magnetic tunnel junction valve having a first edge comprising a sensing surface;
   a first flux guide in proximity to the first edge in a contiguous fashion without overlapping the valve and without a gap, the first flux guide including:
      a first portion proximate an air bearing surface of the magnetic tunnel junction head, the first portion having a first width defining a track width; and
      a second portion proximate the first edge, the second portion having a second width, wherein the first width is smaller than the second width;
   first and second insulating layers sandwiching the first flux guide; and
   first and second shields sandwiching the valve and the insulated first flux guide, wherein the insulating layers and the shields each has a surface portion that has a width defined by the track width and that proximate the air bearing surface.

2. The magnetic tunnel junction head of claim 1, wherein the first flux guide comprises a magnetically soft material.

3. The magnetic tunnel junction head of claim 2, wherein the magnetically soft material comprises a permalloy of Co, Fe, and Ni.

4. The magnetic tunnel junction head of claim 1, wherein the first insulating layer is disposed between the valve and the first flux guide.

5. The magnetic tunnel junction head of claim 1 further comprising a second flux guide in proximity to a second edge of the tunnel junction valve, the second edge is farther than the first edge from the air bearing surface, wherein the tunnel junction valve is disposed between the first and the second flux guides.

6. The magnetic tunnel junction head of claim 5, wherein the second flux guide comprises a magnetically soft material.

7. The magnetic tunnel junction head of claim 6, wherein the magnetically soft material comprises a permalloy of Co, Fe, and Ni.

8. The magnetic tunnel junction head of claim 5, further comprising third and fourth insulating layers for electrically insulating the second flux guide.

9. The magnetic tunnel junction head of claim 8, wherein the first shield proximate the first and the third insulating layers and the valve.

10. The magnetic tunnel junction head of claim 8, further comprising two hard bias layers for stabilizing the magnetization of the tunnel junction valve and the first and second flux guides, wherein the tunnel junction valve and the first and second flux guides are located in between the two hard bias layers.

11. The magnetic tunnel head of claim 10, further comprising two insulating layers for providing electrical insulation for the two hard bias layers from the tunnel junction valve and the first and second flux guides.

12. The magnetic tunnel head of claim 11, further comprising two insulating layers for providing electrical insulation for the two hard bias layers from the second shield respectively.

13. The magnetic tunnel junction head of claim 1, wherein the second insulating layer is disposed between the first flux guide and the second shield.

14. The magnetic tunnel junction head of claim 1, wherein the tunnel junction valve comprises an antiferromagnetic (AF) layer;

a ferromagnetic pinned layer having a magnetization fixed along a preferred direction by the antiferromagnetic layer;

a ferromagnetic free layer having a magnetization controlled by the ferromagnetic pinned layer; and an insulating tunnel barrier located between the ferromagnetic pinned layer and the ferromagnetic free layer for permitting tunneling current in a direction perpendicular to the ferromagnetic pinned and free layers.

15. The magnetic tunnel junction head of claim 1, wherein the track width is between about 0.05 $\mu$m and about 0.1 $\mu$m.

16. The magnetic tunnel junction head of claim 1, wherein a cross-sectional area of the tunnel junction is inversely related to a resistance of the tunnel junction valve, wherein the resistance affects a noise level of the tunnel junction valve, and wherein a signal to noise ratio of the magnetic tunnel junction head is improved by optimizing the cross-sectional area to decrease the noise level of the tunnel junction valve.

17. The magnetic tunnel junction head of claim 1, wherein the first flux guide directs a magnetic flux from a magnetic recording medium to the tunnel junction valve, thereby enhancing a magnetic flux coupling to the tunnel junction valve.

18. A method for producing a magnetic tunnel junction head having a first flux guide defining an actual read track width comprising:

a) making a tunnel junction valve having a first edge comprising a sensing surface;

b) depositing a first flux guide proximate the first edge in a contiguous fashion without overlapping the valve and without a gap, wherein a width of a first portion of the first flux guide proximate the first edge is greater than a width of a second portion of the first flux guide proximate an air bearing surface of the tunnel junction head; and c) providing first and second insulating layers sandwiching the first flux guide; and d) providing first and second shields sandwiching the valve and the insulated first flux guide, wherein the insulating layers and the shields each has a surface portion that has a width defined by the width of the second portion and that proximate the air bearing surface.

19. The method of claim 18, wherein the first insulating layer is deposited between the first flux guide and the valve.

20. The method of claim 18, further comprising a step of depositing a second flux guide in proximity to a second edge of the valve, the second edge is farther from the air bearing surface than the first edge, wherein the valve is between the first and the second flux guides.

21. The method of claim 20, further comprising a step of depositing two hard bias layers, wherein the tunnel junction valve and the first and second flux guides are located between the two hard bias layers.

22. The method of claim 21, further comprising a step of depositing two insulating layers for providing electrical insulation for the two hard bias layers from the tunnel junction valve and the first and second flux guides.

23. The method of claim 22, further comprising steps of depositing two insulating layers for providing electrical insulation for the two hard bias layers from the second shield.

24. The method of claim 20, wherein a) further comprising:

i) depositing a ferromagnetic pinned layer;

ii) depositing an insulating barrier; and iii) depositing a ferromagnetic free layer;

wherein the insulating barrier is between the ferromagnetic free layer and the ferromagnetic pinned layer.

25. The method of claim 24 further comprising a step of depositing an anti-ferromagnetic (AF) layer adjacent to the pinned layer.

26. The method of claim 25 further comprising a step of depositing a first shield adjacent to the AF layer.

27. The method of claim 24 further comprising a step of depositing a second shield adjacent to the free layer.

28. The method of claim 27, further comprising of steps of depositing third and fourth insulating layers for providing electrical insulation for the second flux guide.

29. The method of claim 18, wherein the second insulating layer is deposited between the first flux guide and the second shield.

30. A disk drive comprising:

a magnetic recording disk;

a magnetic tunnel junction head;

an actuator for moving the magnetic junction valve across the magnetic recording disk; and a motor for spinning the magnetic recording disk relative to the magnetic tunnel junction valve, wherein the magnetic tunnel junction head includes:

a magnetic tunnel junction valve having a first edge comprising a sensing surface;

a first flux guide in proximity to the first edge in a contiguous fashion without overlapping the valve and without a gap, the first flux guide comprises:

a first portion proximate the first edge, the first portion having a first width defining a track width; and a second portion proximate an air bearing surface of the tunnel junction head, the second portion having a second width, wherein the first width is smaller than the second width;

first and second insulating layers sandwiching the first flux guide; and first and second shields sandwiching the valve and the insulated first flux guide, wherein the insulating layers and the shields each has a surface portion that has a width defined by the track width and that proximate the air bearing surface.

31. The disk drive of claim 30, wherein the first flux guide comprises a magnetically soft material.

32. The disk drive of claim 31, wherein the magnetically soft material comprises a permalloy of Co, Fe, and Ni.

33. The disk drive of claim 30, wherein the first insulating layer is disposed between the valve and the first flux guide.

34. The disk drive of claim 30 further comprising a second flux guide in proximity to a second edge of the tunnel valve, the second edge is farther than the first edge from the air bearing surface, wherein the tunnel valve is disposed between the first and the second flux guides.

35. The disk drive of claim 34, wherein the second flux guide comprises a magnetically soft material.

36. The disk drive of claim 35, wherein the magnetically soft material comprises a permalloy of Co, Fe, and Ni.

37. The disk drive of claim 36, further comprising a first and a second hard bias layers for stabilizing the magnetization of the tunnel junction valve and the first and second flux guides, wherein the tunnel junction valve and the first and second flux guides are located in between the first and the second hard bias layers.

38. The disk drive of claim 37, further comprising two insulating layers for providing electrical insulation for hard bias layers from the from the tunnel junction valve and the first and second flux guides.

39. The disk drive of claim 30, wherein the second insulating layer is disposed between the first flux guide and the second shield.

* * * * *